(No Model.)
I. REESE.
ROCK DRILL.
No. 322,642. Patented July 21, 1885.
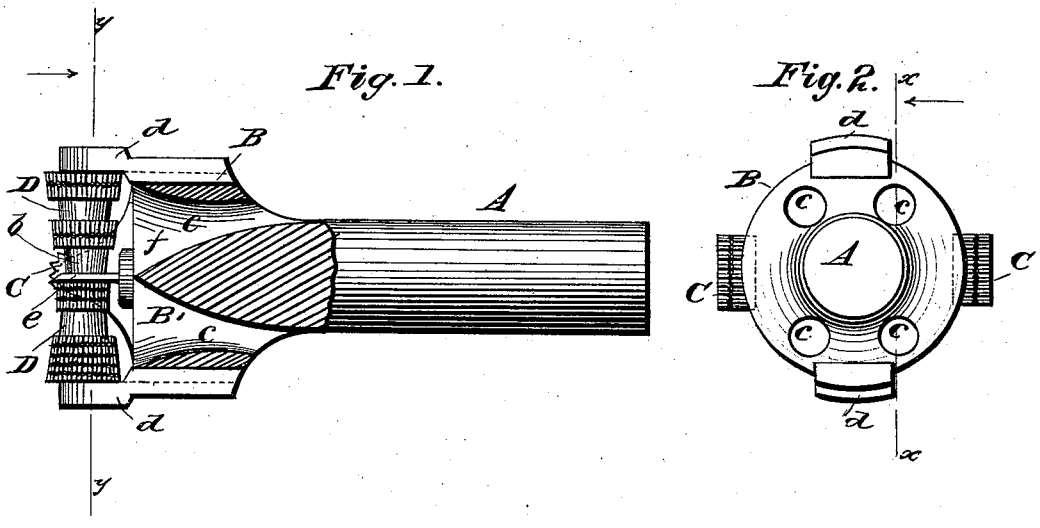
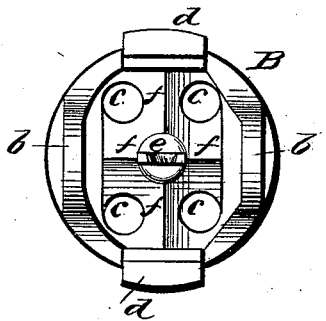
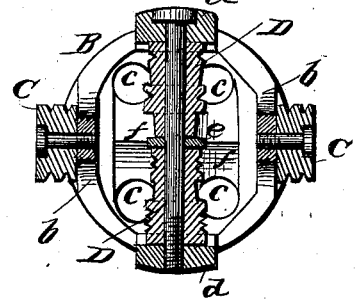
WITNESSES
Phil C. Dieterich
John E. Parker
INVENTOR
Isaac Reese
C. H. Watson & Co. Attorney

UNITED STATES PATENT OFFICE.

ISAAC REESE, OF NASHVILLE, TENNESSEE.

ROCK-DRILL.

SPECIFICATION forming part of Letters Patent No. 322,642, dated July 21, 1885.

Application filed March 23, 1885. (No model.)

*To all whom it may concern:*

Be it known that I, ISAAC REESE, of Nashville, in the county of Davidson and State of Tennessee, have invented certain new and useful Improvements in Rock and Coal Drills; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to cutters for drilling stone, rock, or coal; and it consists in the construction and arrangement of devices, as hereinafter more fully described and claimed.

Figure 1 is a view of the drill-shaft, showing a longitudinal section of the head on the line $x\ x$ of Fig. 2, which represents an inner end view of the head. Fig. 3 is an outer end view of the shaft head with cutting-rollers removed, and Fig. 4 is a cross-section taken on the line $y\ y$ of Fig. 1.

Corresponding letters indicate like parts in the several views.

In the annexed drawings, A represents a shaft composed of malleable iron or other suitable material. This shaft is formed with an enlarged cylindrical head, B, the inner rim of which gradually tapers, with a slightly concaved head, to the shaft A, while its outer edge or rim is concaved from side to side between the opposite lugs $b\ b$, which are evenly dressed on their outer surfaces to form bearings for the journals of the outer drills or cutting-rollers, C C. The head B is also recessed on each side between the lugs $b\ b$ for the reception of the removable lugs or bearings $d\ d$, in which, together with the wedge-shaped bearing $e$ in the center, are journaled the shafts of the inner cutting-rollers, D D. The rollers D D are each in the shape of the frustrum of a cone, their small ends being toward the center. On the surface of these rollers are square points or chisel-shaped teeth, formed of hard steel and arranged in broken series, the teeth of one roller corresponding with the smooth surface of the other, so that what is left uncut by the smooth portion of one roller will be passed over and cut by the teeth of the other one. The surfaces of the outside rollers, C C, are of similar construction, except that these rollers are cylindrical in form and the series of teeth is unbroken. The rollers C D are so arranged concentrically that the cutting-teeth of each set prepare and clear a track for the bearings of the other set. The interior of the cylindrical head B is chambered and provided with several longitudinal perforations, $c\ c$, extending from the center backward and outward, and leaving the chamber traversed by corners or sharp beveled ridges, which extend from the base of the wedge-shaped bearing $e$ to the walls of the flaring chamber B. While rock or coal is being cut by the revolution of the shaft A and pressure of the head B and its revolving drills or cutting-rollers C D against the same, the dust is collected in the chamber B', whence it is deflected and thrown by the beveled ridges $f$ into the perforations or channels $c\ c$, and thence backward and outward, so as to avoid obstructing the operation of the drills. The sharp edge of the wedge-shaped projection or bearing $e$ in center breaks off the splinters or chips left by the rollers. A series of these drills mounted on suitable shafts may be so arranged as to cut any number of openings desired, and may be operated by any convenient motive power applied to shafts.

From the foregoing description the operation and advantages of my improved drill will be readily understood. It is simple, compact, durable, and efficient. The dust and débris made by the cutters are thoroughly removed without danger of clogging or obstructing the work of the drills, and the cutters may be easily repaired or replaced when broken.

I am aware that drills have been provided with cylindrical heads having longitudinal perforations or channels leading to a central hollow shaft, and with cutting-teeth set in radial rows in such a manner that the teeth of one row will cut the space left in the rock not cut by those of the other row.

Having thus fully described my invention, what I claim, and desire to secure by Letters Patent, is—

In a rock or coal drill, the combination, with a shaft, A, having a chambered cylindrical head, B, provided with a central wedge-shaped bearing, e, side bearings, b d, and interior beveled ridges, f, leading to outwardly-curved longitudinal perforations c, of the cylindrical cutting-rollers C C, journaled in opposite bearings on the outer surface of the drill-head, and the conical rollers D, journaled centrally in the head of the drill, substantially as shown and described.

In testimony that I claim the foregoing as my own I have hereto affixed my signature in presence of two witnesses.

ISAAC REESE.

Witnesses:
  JNO. A. HITCHCOCK,
  JNO. LELLYETT, Jr.